United States Patent [19]
Fisher et al.

[11] Patent Number: 5,569,898
[45] Date of Patent: Oct. 29, 1996

[54] SELECTIVE CARD ENTRY GATE WITH RIDGED PROFILE

[75] Inventors: Richard G. Fisher, San Pedro; Lawrence R. Meyers, Hermosa Beach, both of Calif.

[73] Assignee: Mag-Tek, Inc., Carson, Calif.

[21] Appl. No.: 475,553

[22] Filed: Jun. 7, 1995

[51] Int. Cl.⁶ .................................................. G06K 7/04
[52] U.S. Cl. ......................... 235/448; 235/449; 235/475; 235/486; 235/483; 902/17; 902/28; 194/212
[58] Field of Search .................................. 235/448, 449, 235/475, 482, 483, 485, 486; 902/17, 28; 194/212, 214, 347

[56] References Cited

U.S. PATENT DOCUMENTS

| | | | |
|---|---|---|---|
| 1,795,739 | 3/1931 | Shield | 194/212 |
| 3,595,358 | 7/1971 | Chase | 194/212 |
| 3,766,687 | 10/1973 | Henson | 49/35 |
| 3,815,719 | 6/1974 | Streeter et al. | 194/212 |
| 3,909,595 | 9/1975 | Morello et al. | 235/483 X |
| 3,995,728 | 12/1976 | Kerby | 194/4 |
| 4,137,449 | 1/1979 | Townsend et al. | 235/449 X |
| 4,171,737 | 10/1979 | McLaughlin | 194/4 |
| 4,322,613 | 3/1982 | Oldenkamp | 235/449 |
| 4,488,036 | 12/1984 | Butts | 235/482 |

OTHER PUBLICATIONS

P. Arsenault et al, Card Reader, Dec. 1966, pp. 770–771, vol. 9, No. 7, IBM Technical Disclosure Bulletin.

Primary Examiner—Donald T. Hajec
Assistant Examiner—Michael G. Lee
Attorney, Agent, or Firm—Darby & Darby P.C.

[57] ABSTRACT

A card entry gate has a slot defining several ridges extending longitudinally from the upper and lower surfaces of the slot. A data-bearing card, with an encoded strip and embossed portions, fits between the ridges of the slot when inserted lengthwise in any orientation. The ridges are positioned to avoid the encoded strip and the embossed portions, thereby preventing damage to the card and reducing jitter. The ridges further resist the malicious or accidental insertion of certain coins, odd-shaped cards, and many foreign objects.

10 Claims, 1 Drawing Sheet

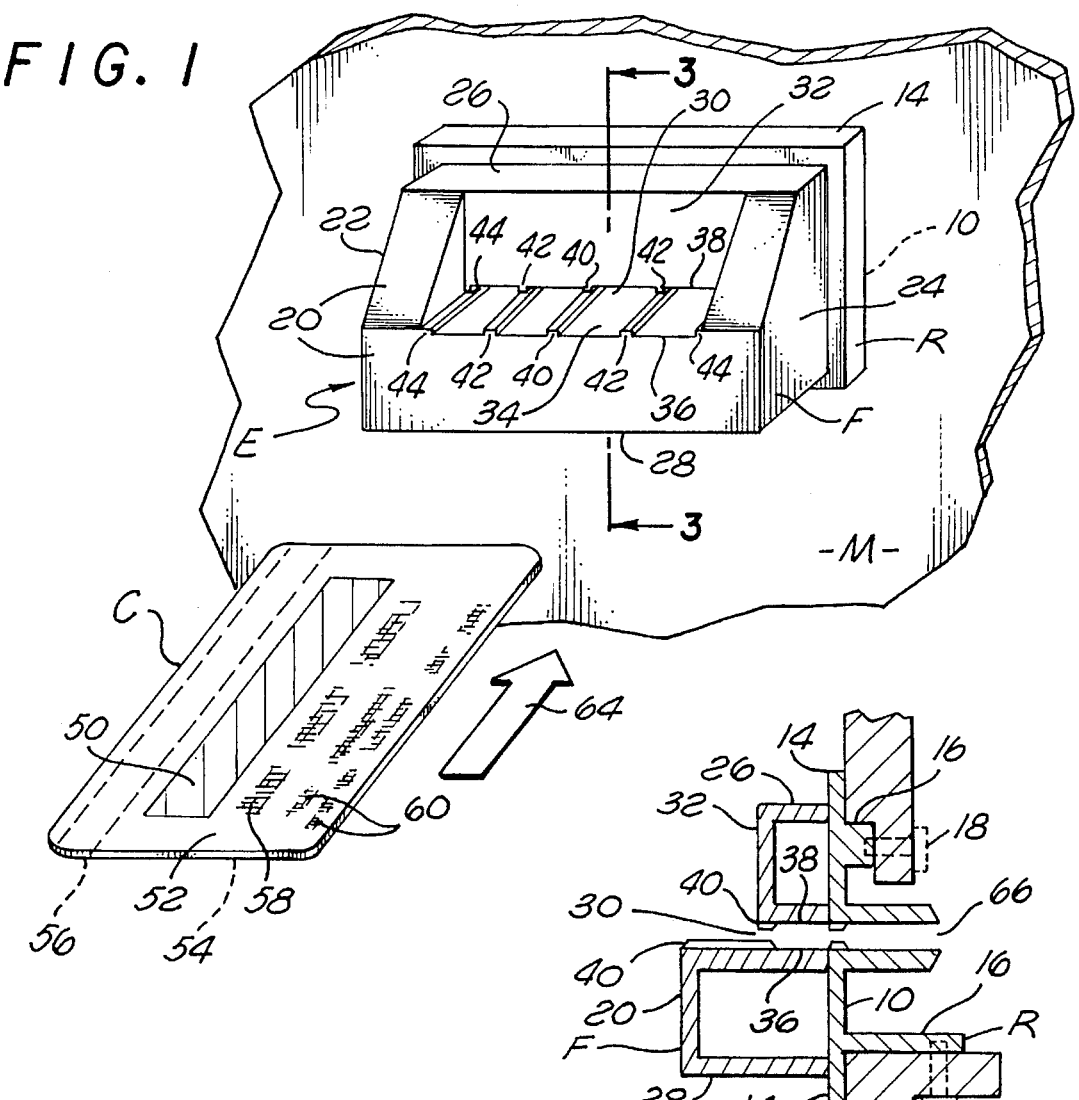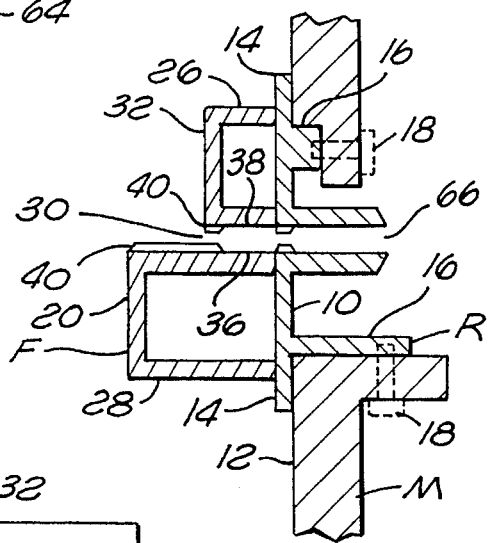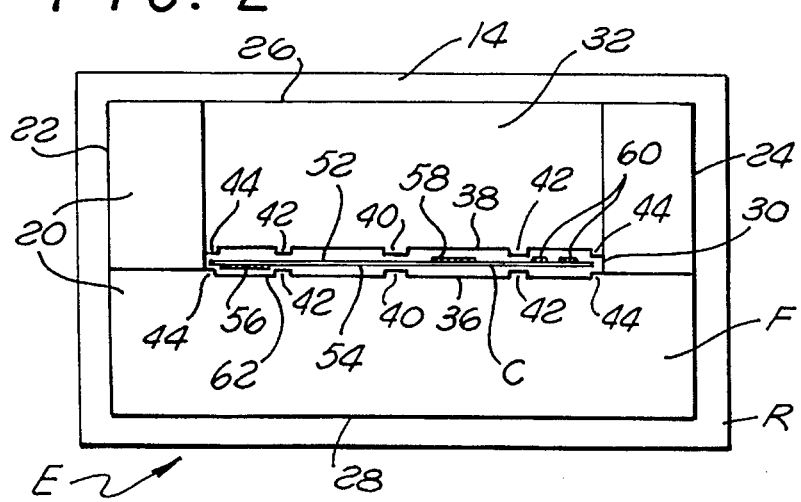

SELECTIVE CARD ENTRY GATE WITH RIDGED PROFILE

BACKGROUND OF THE INVENTION

The invention relates to card entry gates, and more particularly to card entry gates for vending machines and other automated systems capable of accepting authorized data-bearing cards in any lengthwise orientation while rejecting certain coins, unauthorized cards, and other foreign objects.

The importance of protecting card reading and writing devices against the insertion of foreign matter and improper cards has long been recognized. Because such machines are often left unsupervised, vandals may attempt to maliciously damage card slots or gain access to a machine by forcibly inserting foreign objects such as sticks, tools, and other items. And particularly in the case of non coin-operated vending machines, a customer may try to insert coins into the card slot, where the coins may become lodged. In addition, card processing devices, such as vending machines and automated teller machines, are often located outdoors and exposed to the elements. Thus, complicated internal mechanisms are relatively expensive, vulnerable, and may be subject to breakdown.

An additional problem is posed by the presence of jitter. Where an embossed card enters a narrow slot, the embossed portions of the card may rub and occasionally bind on portions of the slot, causing irregularities in the speed at which the card travels through the reader, known as "jitter." This makes it more difficult for a card reader to correctly resolve the data stored on the card. Furthermore, undesired wear on the embossed portions of the card may result.

Solutions to these problems have been proposed, but all have had significant shortcomings for a number of reasons. As indicated, machines incorporating a complicated card handling mechanism may be expensive and difficult to repair. In addition, because such machines may be widely located, the downtime suffered before a damaged machine is located and repaired may be significant, leading to customer dissatisfaction.

The configuration of data-bearing plastic cards of the type treated herein is now somewhat standardized by ISO specifications 7811-1 through 7811-5. Cards manufactured to conform with those specifications have a particular size, as well as a specified arrangement of a magnetic stripe and embossed portions. The card has a defined basic thickness, but the embossed portions are substantially thicker. When accepting a card into a card processing apparatus, it is important to protect not only the magnetic stripe (or perhaps other areas) from wear and abrasion, but as noted above, the thickened portions also should be protected from damage.

Prior card entry gates have used a variety of means to solve some of these problems. Some have required complex electromechanical systems to detect the presence of an authorized card before allowing the slot to open. See, for example, U.S. Pat. No. 3,909,595 to Morello et al., issued Sep. 30, 1975 and entitled "Entry Gate Construction for Credit Card Actuated Automatic Remote Banking Equipment." As indicated above, with such an elaborate mechanism, one must be concerned about the potential for significant additional cost, complexity, and unreliable operation of the entry gate. However, it is noteworthy that the system of Morello also includes a contoured card slot to reject foreign matter and allow the insertion of an embossed card having a magnetic stripe; however, it allows insertion of the card in only one orientation, and is unnecessarily complicated by the electromechanical components.

Other card entry gates have included complicated mechanical linkages to detect proper card size and thickness, among other qualities. See, for example, U.S. Pat. No. 4,171,737 to McLaughlin, issued Oct. 23, 1979 and entitled "Entry Control Device." Again, these systems prompt concern for possible fragility and expense in construction and upkeep. Such card slots may also require some amount of pressure to be exerted through a rigid card to operate the gate. See, for example, U.S. Pat. No. 3,995,728 to Kerby, issued Dec. 7, 1976 and entitled "Anti-Vandal Credit Card Gate." Because force must be applied through the card, these mechanical systems may not be easily adaptable to certain flexible plastic or paper cards, as in temporary cards, which would flex without opening the gate.

The shortcomings of prior card entry gates highlight the need for a simple, reliable device with no moving parts or electronic components which are subject to failure. Furthermore, the need exists for a device which will accept a variety of authorized cards in a range of varying thicknesses, in various orientations, without likely damage and without jitter.

SUMMARY OF THE INVENTION

The card entry gate of the present invention defines a slot with a plurality of ridges extending thereinto. The ridges allow a genuine or authorized card to be inserted into a vending machine or other apparatus, while preventing the entry of certain coins, trash, unauthorized and improperly shaped cards, and other foreign matter.

The card entry gate of the present invention is intended to accept cards configured in accordance with the ISO specifications. Furthermore, the card entry gate of the present invention is capable of accepting cards which are thinner or weaker than standard cards. For example, a temporary card made of flexible plastic or paper would not necessarily be rejected.

The ridges provided by the entry gate of the present invention define a slot with a thickness substantially equal to the thickness of a standard authorized card. The defined gaps between ridges allow embossed portions of the card, along with a magnetic stripe, to pass through the slot while avoiding wear and damage. The ridges would also permit any other thickened or fragile portion of an authorized card, if such portions are properly aligned between the ridges, to pass into the slot without damage or abrasion. Because the embossed portions of the card do not contact any surface of the entry slot, the problem of jitter is substantially reduced.

The card entry gate of the present invention is simple, reliable, and inexpensive in design. It has no moving parts, and may be formed of a single block of material. In a preferred embodiment, however, a two-piece configuration is used.

BRIEF DESCRIPTION OF THE DRAWINGS

FIG. 1 is an isometric view of a card entry gate according to the present invention, with an authorized card positioned for insertion;

FIG. 2 is a front elevational view of the card entry gate of FIG. 1 with an authorized card inserted therein and shown in section; and FIG. 3 is a vertical sectional view of the card entry gate, taken along line 3—3 of FIG. 1.

DESCRIPTION OF THE PREFERRED EMBODIMENT

As required, a detailed illustrative embodiment of the present invention is disclosed herein. However, a card entry gate in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Referring to FIG. 1, there is shown a card entry gate block E according to the present invention attached to a card actuated apparatus or machine M (fragmentarily illustrated). The gate block E is designed for use with a card C, which is shown positioned for insertion. In operation, the gate block E selectively accommodates the passage of the card C into the machine M.

The gate block E is a solid structure, assembled from a combination of parts or in a unitary piece, defining a rear surface 10 that is affixed flush to a front panel 12 of the machine M. The rear surface 10 embraces a flange 14 extending around the portion of the gate block E contacting the front panel 12. The flange 14 includes at least one lip portion 16 (FIG. 3) extending into the machine M and adapted to receive mechanical fasteners 18. The mechanical fasteners 18 extend through the panel 12 into the lip portion 16 to secure the gate block E to the machine M.

Extending from the panel 12, the gate block E terminates in a tapered front surface 20, an upper portion of which is offset from the vertical. The gate block E is of substantially uniform width, with opposed sides 22 and 24 spaced apart by a distance somewhat greater than the width of the card C.

Between the front surface 20 and the flange 14, the gate block E defines a top horizontal surface 26 and a bottom horizontal surface 28. Accordingly, the front surface 20 is oriented for an elevated view by a user in the likely event that the gate block E will be mounted between waist and shoulder height for most users. Thus, a convenient access is provided for typical users.

To receive the card C, the gate block E defines an elongate horizontal entry slot 30 that extends to the panel 12 and affords access to the interior of the machine M. Between the top horizontal surface 26 and the slot 30, the front surface 20 defines a cutaway portion 32 having a width substantially equal to the width of the slot 30, exposing an outer overhang portion 34 of a lower internal surface 36 of the slot 30. The cutaway portion 32 allows a user to easily align a card for insertion into the slot 30; in a preferred embodiment, the cutaway portion 32 flares somewhat toward the front surface 20 to facilitate alignment of the card. Along the width of the slot 30, gaps of two different dimensions are provided, defining a set of ridges 40, 42, and 44. Consider the horizontal, opposed upper and lower ridged internal surfaces 38 and 36 defining the slot 30. Note that the irregular shape of the slot 30 (FIGS. 1 and 2) at its entry may be uniform through the gate block E, but in a preferred embodiment, the ridges 40, 42, and 44 recede into the upper and lower internal surfaces 38 and 36 as the rear surface 10 is approached. In that regard, extending through at least a portion of the gate block E, both the upper and lower internal surfaces 38 and 36 define a central ridge 40, two side ridges 42 on opposite sides of the central ridge 40, and two edge ridges 44 at the lateral edges of the slot 30.

The gate block E can be manufactured in various ways from any of several rigid materials. For example, using various production techniques, it may be molded, machined, stamped or pressed of plastic or metal into the form illustrated. The gate block E may be formed in a unitary structure, or it may be assembled from several separate pieces. In a preferred embodiment, the gate block E is formed of an injection molded plastic material in two pieces of contrasting color: a rear portion R comprising the flange 14, lip portion 16, and rear surface 10, and a front portion F comprising the remainder of the gate block E. In a preferred embodiment, the portion of the slot 30 extending through the rear portion R also presents a ridged profile, so that the benefits of the present invention may still be realized without any front portion F attached. Various fasteners or welds may be employed to affix the front portion F to the rear portion R, and in a similar fashion, to affix the gate block E to the panel 12. Of course, the machine M may take a multitude of structural and functional forms for receiving and processing embossed cards bearing a magnetic stripe.

The card C for use in the present system (FIG. 1) is substantially planar, and may contain optional printed markings 50 on its front surface 52 and back surface 54. As shown in phantom (dashed lines), the card C also contains an encoded magnetic stripe 56 on its back surface 54. On the front surface 52 of the card C, there may be a first embossed area or portion 58, traditionally containing the card number. There also may be a second embossed area or portion 60, traditionally containing such information as the card bearer's name, the expiration date of the card, etc. The embossed portions 58 and 60, along with the unembossed portions, define two different thicknesses for various areas of the card C, presented as a profile across the width of the card. The ridges 40, 42, and 44 are sized and positioned to selectively pass the different thicknesses presented by the profile of the card C upon insertion.

The interaction between the card C and the gate block E of the present invention is shown in FIG. 2. When inserted, card C mates between opposing pairs of central ridges 40, side ridges 42, and edge ridges 44 defined by the upper internal surface 38 and lower internal surface 36 of the entry slot 30. Also, the magnetic stripe 56 is protected from abrasion and damage, being essentially suspended in an empty space 62 between one of the side ridges 42 and one of the edge ridges 44. Similarly, the first embossed portion 58 fits between a central ridge 40 and a side ridge 42, and the second embossed portion 60 fits between a side ridge 42 and an edge ridge 44. If the embossed portions 58 and 60 of the card C are not configured according to the ISO standards, then such thicker areas may interfere with the ridges 40, 42, and 44, prohibiting entry of the card through the gate. In addition, a card which is too thick may not fit between opposing pairs of ridges 40, 42, and 44, and may not be entered. A card for use with the present system also may include thickened portions which are not embossed, as long as the configuration of the thickened portions is selected to avoid pairs of ridges 40, 42, and 44. The ridges 40, 42, and 44 comprise the only points of contact between the card C and the gate block E; thus, because the ridges 40, 42, and 44 avoid contact with the vital information-bearing portions of the card C, the card C is not damaged or otherwise harmed by repeated insertions through the gate block E.

It is noteworthy that the entry slot 30, defined by the upper and lower internal surfaces 38 and 36 and the central ridges 40, the side ridges 42, and the edge ridges 44, is configured symmetrically, so that an authorized card may be inserted, in the direction of arrow 64, in any lengthwise orientation: face up and right side first; face up and left side first; face down and right side first; or face down and left side first.

With the ridges 40, 42, and 44 so arranged, it has been found that the card entry gate of the present invention is effective in rejecting foreign objects, such as certain coins. Coins, which are generally thicker than the unembossed portions of an authorized data card, will not fit between pairs of ridges 40 and 42 or between pairs of ridges 42 and 44. In addition, because the entry slot 30 is narrow, the entry of other rigid objects, often calculated to cause damage, is effectively resisted.

FIG. 3 depicts a cutaway side view of the gate block E and slot 30. As shown, the slot 30 has a significantly longer depth, from the front surface 20 to a rear terminus 66, than height, from the upper internal surface 38 to the lower internal surface 36. This prevents a user from circumventing the screening function of the gate block E by inserting unauthorized cards or other objects at any inclination from the horizontal. Additionally, the long, narrow slot 30 tends to guide an authorized card C toward a desired horizontal orientation.

In one embodiment, it has been determined that advantageous dimensions for the front portion of the entry slot 30 are approximately as follows: full slot height, 0.100 in.; gap height between a pair of opposing ridges, 0.044 in.; slot width, 2.15 in.; slot depth, at least 0.84 in.; width of the central and side ridges, 0.063 in.; width of the edge ridges, 0.095 in.; distance from a lateral edge of the slot to the nearest edge of a side ridge, 0.651 in.; distance from a lateral edge of the slot to the nearest edge of the central ridge, 1.043 in.

In a preferred embodiment, the slot 30 widens at approximately a four degree central angle from the front of the gate block E towards the rear; such an arrangement would afford a card processing machine M easier access to the slot from the rear for returning a card to the user, while retaining the other advantages of the system.

In view of the above explanation of the exemplary system, it will be appreciated that embodiments of the present invention may be employed in many different applications to screen foreign objects from a card processing apparatus. While certain exemplary structures and operations have been described herein, the appropriate scope hereof is deemed to be in accordance with the claims as set forth below.

What is claimed is:

1. A card entry gate for use with a data-bearing card primarily of a first thickness and having at least one portion with a larger second thickness, comprising:

a card processing apparatus to receive said card;

a gate block affixed to said apparatus defining an entry slot into said apparatus, said slot having a front, an upper surface, an opposed lower surface, and a height therebetween at the front capable of embracing said second thickness; and at least one upper ridge defined by said upper surface and at least one lower ridge defined by said lower surface, said ridges protruding at least partially into said entry slot and defining a gap therebetween having a height capable of embracing said first thickness, wherein said ridges are arranged in such a manner that the data-bearing card may be inserted into said entry slot between said upper and lower ridges in any of a plurality of orientations.

2. The card entry gate of claim 1, wherein:

said entry slot has a longitudinal centerline; and said ridges comprise a configuration symmetrical about a plane containing said centerline and perpendicular to said entry slot.

3. The card entry gate of claim 1, wherein:

said entry slot has a longitudinal centerline; and said ridges comprise a configuration symmetrical about a plane containing said centerline and parallel to said entry slot.

4. The card entry gate of claim 1, wherein said entry slot rejects coins and improperly shaped cards.

5. The card entry gate of claim 1, wherein the data-bearing card has embossed portions.

6. The card entry gate of claim 5, wherein said ridges avoid said embossed portions when the data-bearing card is inserted into said entry slot.

7. The card entry gate of claim 1, wherein the data-bearing card has an encoded strip.

8. The card entry gate of claim 7, wherein said ridges avoid said encoded strip when the data-bearing card is inserted into said entry slot.

9. The card entry gate of claim 1, wherein said gate block comprises:

a tapered rectangular portion defining said slot; and at rear flange portion for mounting said gate block to said apparatus.

10. A card entry gate for use with a data-bearing card primarily of a first thickness and having at least one portion with a larger second thickness, comprising:

a gate block defining an entry slot, said slot having a front, an upper surface, an opposed lower surface, and a height therebetween at the front capable of embracing said second thickness; and at least one upper ridge defined by said upper surface and at least one lower ridge defined by said lower surface, said ridges protruding into said entry slot and defining a gap therebetween having a height capable of embracing said first thickness, wherein said ridges are arranged in such a manner that the data-bearing card may be inserted into said entry slot between said upper and lower ridges in any of a plurality of orientations.

\* \* \* \* \*